United States Patent [19]
Stirewalt

[11] 3,827,176
[45] Aug. 6, 1974

[54] ELECTRONIC EXECUTING DEVICE FOR MOLES, GOPHERS AND THE LIKE

[76] Inventor: Homer A. Stirewalt, 1016 Maple Dr., Windsor, Calif. 95492

[22] Filed: Oct. 23, 1973

[21] Appl. No.: 408,385

[52] U.S. Cl. .................................................. 43/98
[51] Int. Cl. ........................................... A01m 19/00
[58] Field of Search ................................. 43/98, 99

[56] References Cited
UNITED STATES PATENTS
1,680,594  8/1928  Connolly et al. .................. 43/98
3,468,054  9/1969  Levine ................................ 43/98

Primary Examiner—Warner H. Camp

[57] ABSTRACT

An electronic executing device intended for the electrical execution of moles, gophers and the like including a pair of high voltage grids spaced on opposite sides of a windowed aperture having a swinging door associated therewith and operatively connected to an electrical switch, the door adapted to activate the switch upon swinging movement of the door upon activation by the mole, gopher, or the like to electrically energize the grids for a timed cycle of operation to electrocute the mole contacting the grids. A modified alternative provides for a reciprocally slidable door rather than a swinging door to activate the electrical switch to energize the grids.

8 Claims, 4 Drawing Figures

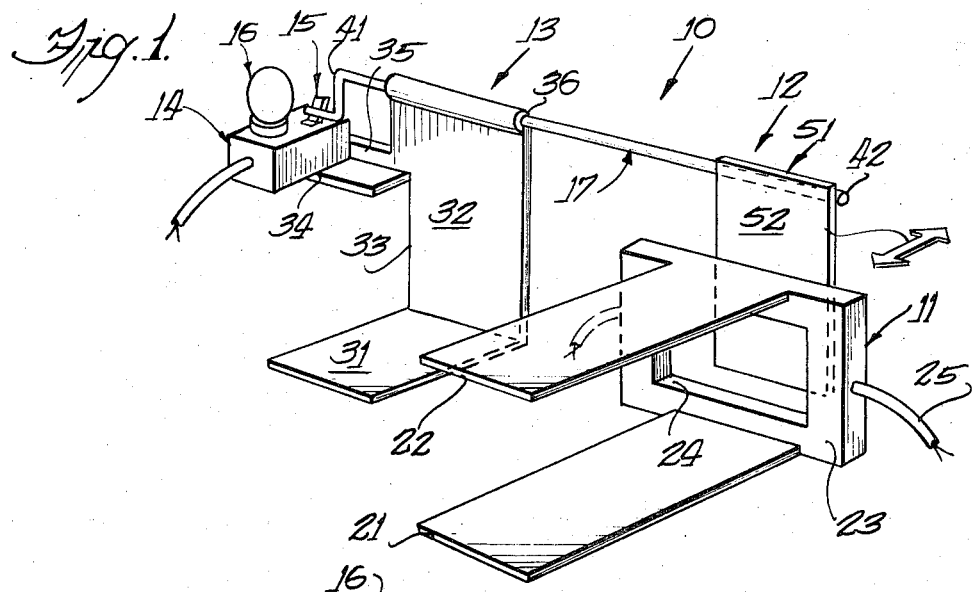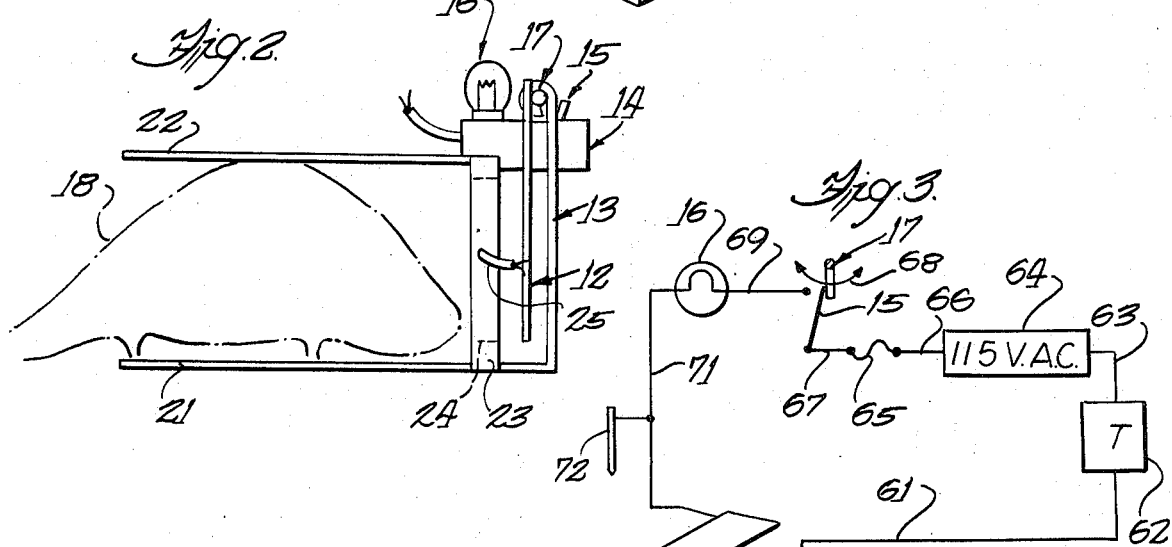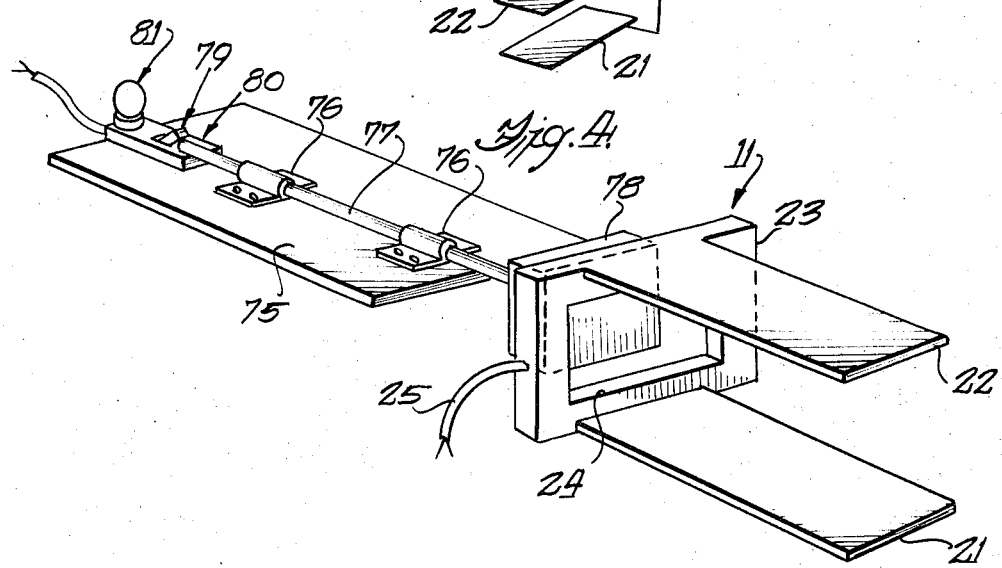

ELECTRONIC EXECUTING DEVICE FOR MOLES, GOPHERS AND THE LIKE

BACKGROUND OF THE INVENTION

1. Field of the Invention

This invention relates generally to exterminating devices and more particularly to a novel and improved electrically energized device for the electrical execution of moles, gophers, and the like.

2. Description of the Prior Art

Homes, golf courses, and other places having real estate are constantly plagued with the problems of moles, gophers and other burrowing type animals which cause innumerable amounts of damage to the lawns and gardens as well as providing numerous unsightly holes therein as they burrow therethrough. The elimination of these animals has proved to be quite difficult and expensive, with such attempts including the setting of traps, the flooding of the burrows, and the like, but such attempts are generally proven to be ineffective due to the fact that these animals most often have a great number of burrows and cannot be readily located or trapped.

While many types and configurations of manual traps have been devised, none have met with much success for these types of animals as they soon learn to successfully avoid the same based on the experience and cries of their mates when trapped therein such that while effective for a short time, such traps soon become ineffective with the animals learning to avoid the same.

In view of such problems, prior art devices have been developed which electrically execute such animals, with such prior art devices as presently developed being comparatively complicated devices requiring a high level of maintenance and repair, requiring that the dead animals be cleaned out of the trap with such cleaning being a difficult situation when such traps are of the box or container type, or by being of a design which electrically executes the animal and then continues to char and cook the animal as long as the dead animal is in contact with the electrical grids, this thus frightening off any further animals.

It would thus be desirable to provide an electrically energized trap for instantaneously executing an animal therein while preventing any outcries or other indications of such animal to other animals in the area who might then learn to avoid such device.

SUMMARY OF THE INVENTION

The present invention recognizes the problems and difficulties of prior art devices and provides a novel electrically energized device for electrically executing moles, gophers, and the like, the device blending into the surroundings so as not to require any type of container, cage or the like so as to be barely noticeable to the animal while being easily cleaned of dead animals, with the device being positive and rapid in operation.

It is a feature of the present invention to provide a device for electrically executing moles and the like upon activation by the mole, the device being completely self contained and being operable from an ordinary electrical outlet such as found in homes, offices and the like.

Still a further feature of the present invention provides a device for electrically executing moles and the like which is operated by the mole itself and provided with a self-timer to regulate timed periods of electrical current flow through the high voltage grids to electrocute the mole without cooking or charring the mole which would otherwise scare other animals away from the device.

The provision of an electronic execute device for moles, gophers and like animals, such as briefly outlined above, and possessing the stated advantages, constitutes the principal features and advantages of the present invention. The provision of an electronic executing device which is relatively simple in its construction and which therefore may be readily manufactured at a relatively low cost and by simple manufacturing methods; one which is rugged and durable and which therefore may be guaranteed by the manufacturer to provide many years of intended usage; one which is easy to use and efficient in operation; one which is readily adapted to be placed in paths normally used by such animals without detracting from the path such that the animal readily passes therethrough to be electrocuted; one which is easily reset and cleaned; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of an electrical executing device constructed in accordance with the present invention;

FIG. 2 is a side elevational view of the device of FIG. 1 illustrating a mole between the grids preparatory to swinging the door to activate the device;

FIG. 3 is an electrical schematic diagram of the device; and

FIG. 4 is a perspective view of a modified form of the invention as to the operation of the door to operate the electrical switch.

DESCRIPTION OF THE PREFERRED EMBODIMENT

Referring now to the drawings and in particular to FIGS. 1 to 3 inclusive, a first preferred form of an electronic executing device embodying the invention is illustrated and is designated in its entirety by the reference numeral 10 and is comprised of a grid structure 11, a swinging door trigger type device 12, a supporting bracket 13, an electrical box 14 containing an electrical toggle type switch 15 and a warning light 16, and a rod 17 interconnecting the trigger device 12 to the toggle switch 15 for operation thereof.

The grid structure 11 comprises a pair of horizontally disposed bare electrical grids 21 and 22 spaced one above the other in vertical spaced apart alignment and extending parallel to each other, the adjacent ends of each grid secured to an electrical insulating block 23 provided with a rectangular window like aperture or doorway 24 extending completely therethrough between the grids and of a size and shape to permit free passage of an animal therethrough, such as a mole, gopher or the like such as generally specified by reference numeral 18. The grids 21 and 22 are electrically insulated from each other and connected by suitable electrical wiring 25 to an electrical circuit as will be later described.

The supporting bracket 13 is of a general L-shape as shown in the drawings having a horizontal base member 31 and a vertical support member 32 which, in turn, has projecting from one edge 33 thereof a secondary support bracket including a horizontal ledge 34 and a vertical ledge 35, the electric box 14 being rested on the horizontal ledge 34 and mounted thereto in any suitable manner, such as by screws, bolts, and the like. The top edge of the vertical support member 32 is bent over onto itself to form a laterally extending cylindrical slot 36 therethrough of a diameter adapted to rotatably receive rod 17 therein for rotation of the rod about its longitudinal axis.

The rod 17 extends through cylindrical opening 36 and projects out of each end thereof laterally from vertical support member 32, one end 41 of the rod 17 being bent in a bell-crank manner to engage the actuating member of the toggle switch 15 projecting outwardly of the electrical box 14, the opposite end portion 42 of the rod 17 being secured adjacent the top edge 51 of a substantially flat rectangularly shaped member 52 forming the swinging door trigger device 12, the end portion 42 secured to member 52 by welding or the like.

As seen in FIG. 1, grid structure 11 is preferably placed directly in a path used by the animal 18, with supporting bracket 13 spaced a distance to the side thereof with the door member 52 suspended adjacent the insulating block 23 in a position spaced apart from but blocking the doorway 24. In this vertically disposed position of member 52 the toggle switch 15 is in the normally de-energized position. Upon the entrance of an animal 18 intermediate the grids 21 and 22, the animal walks upon grid 21 with the animal's backside contacting grid 22 with the animal passing through doorway 24 and nudging member 52 pivotally about rod 17 to effect the rotation of the rod in a manner such that rod end portion 41 trips the toggle switch 15 into the energized position to pass an electrical current into the grids 21 and 22 and thus substantially instantaneously electrocute the animal 18 intermediate the grids. This electrocution is quick and rapid with the animal having no time to cry out or provide a warning to others, with there being no burning or charring of the animal such that there is no warning for other animals as to the presence of the trap. At the time of removing the dead animal from the trap, switch 15 is reset to the de-energized position and the trap is again ready for further usage.

Referring to FIG. 3 there is shown a typical wiring diagram for the electrical circuit of the executing device 10 wherein it is seen that grid 21 is connected by a suitable wire 61 to one end of a timer 62, the opposite end of the timer being connected by a suitable wire 63 to a suitable source of electrical voltage, such as provided by a standard available 115 volt alternating current circuit as designated by reference numeral 64. This circuit is protected for safety reasons with a 3 ampere fuse 65 connected at one end to the voltage source 64 by a suitable electrical wire 66, and connected at the opposite end by a suitable wire 67 to one end of the electrical toggle switch 15, the electrical toggle switch being operable by rod 17 which moves in the direction of arrow 68 in a manner to close switch 15 which, through wire 69, is connected to the warning light 16, the opposite end of the warning light being connected by a suitable electrical wire 71 to grid 22.

Thus, upon closing of switch 15 the electrical current passes through timer 62 and energizes grids 21 and 22 in a manner to electrocute the animal 18 intermediate the grids, the timer 62 being adjustably preset for any time range between 0 to about 5 minutes to de-energize the circuit to avoid any potential safety hazard, it being understood that the animal is almost instantaneously electrocuted between the grids with the animal then falling away from the top grid 22 in a manner to open the electrical circuit as only the presence of an external object, such as an animal, extending between the grids 21 and 22 completes the electrical circuit. By having the animal fall away from the grids, any burning or charring of the animal with the resulting unpleasant odor is avoided so that no warning to other animals is provided.

It is to be understood that the circuit of FIG. 3 is a preferred circuit, but that alterations could be made therein within the scope of the present invention, such as by electrically interconnecting the grids 21 and 22 and placing the same vertically rather than horizontally such that the animal walks therebetween and either side of the animal's body contacts either of the grids, with the grids being connected to the circuit by wire 61, with the wire 71 being connected to the ground on which the animal walks by a ground rod 72 such that upon energization of the circuit the body of the animal completes the circuit between either of the grids and the ground to accomplish the electrocution of the animal, the timer in such instance being set for a short period of time to avoid the burning or charring of the animal on the grids.

Referring now to the modified embodiment of FIG. 4, the grid structure 11 is identical to that as previously described with the remaining structure being modified as seen in the drawing, specifically there is provided a base member 75 having a pair of winged inverted U-shaped guiding members 76 disposed in axial alignment and mounted on the top surface thereof to reciprocally receive therein for sliding movement relative thereto an elongated rod 77 having one end terminating in a rectangular door member 78 with the opposite end terminating adjacent a toggle switch 79 mounted on an electrical box 80 which also has an electrically operated warning lamp 81 mounted thereon.

In operation of this modified embodiment, the grid structure 11 is placed in an animal's pathway in the same manner as aforedescribed, with the base 75 being longitudinally aligned with the grid structure such that the door member 78 is disposed adjacent to and spaced slightly away from the insulating block 23 in a manner to block the opening or doorway 24, the switch 79 being in the off position such that an animal passing between the grids and through doorway 24 moves the door member 78 and associated rod 77 longitudinally to effect the operation of the toggle switch 79 thus energizing the grids 21 and 22 through timer 62 in the same manner as aforedescribed with regard to the embodiment of FIGS. 1 and 2, it being understood that the schematic of FIG. 3 applies equally to this embodiment as well as the prior described embodiment.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. An electrical executing device for moles, gophers and like animals comprising:

a grid structure including a pair of spaced apart parallelly disposed bare electrically conductive grids, an insulating block member having one end of each grid attached thereto with the block member retaining the grids in horizontally extending vertically aligned spaced apart positions, an opening defining a doorway extending through the block intermediate the grids with the opening being of a size and configuration to permit a portion of the animal's body to project therethrough, suitably insulated electrical wires each having one end connected to an associated grid member with the opposite ends projecting outwardly of the insulating block;

a door disposed adjacent the insulating block opposite the grid members in a position spaced apart from the insulating block and overlapping the doorway extending therethrough, the door being pivotally suspended for movement between a closed position covering the door opening in the insulating block to an outward open position uncovering the doorway in response to an outward pressure of an animal against the door when the animal is standing intermediate the grids and projecting through the doorway to engage the door;

an electrical input means;

an electrical switch means electrically interconnecting the grids to the electrical input means when the switch is in the energized position and de-energizing the grids from the input means when the switch is in the de-energized position;

a connecting means interconnecting the door to the switch for movement of the switch between the normally de-energized position to the energized position upon the outward swinging of the door relative to the insulating block; and an electrically operated timer interposed electrically in the circuit between the electrical switch and the electrical input means for retaining the grids electrically energized for a preset time after energization thereof by the switch means and then de-energizing the grids until the switch means is manually reset.

2. The executing device as set forth in claim 1 further comprising a supporting bracket including a horizontally extending base member and a vertically extending support member, the top edge of the support member being doubled over onto itself to define a cylindrical bore extending laterally therethrough and adapted to rotatably support the connecting means for movement in opposite directions about the longitudinal axis of the connecting means, a horizontally extending ledge formed integrally with the vertical support member and extending laterally out of one side edge thereof, an electrical box mounted on the horizontal ledge, the switch means comprising an electrical toggle switch mounted in the electrical box and having a toggle actuating mechanism projecting outwardly of the box, and the connecting means being operatively associated with the toggle actuating member to effect the movement thereof upon the swinging movement of the door member in an outward direction relative to the insulating block.

3. The executing device as set forth in claim 2 further comprising an electric lamp mounted in the electric box and electrically interconnected in electrical series relationship with the switch means, grid members, and electrical input means to provide a visual warning when the electrical circuit is electrically energized.

4. The executing device as set forth in claim 3 wherein the connecting means comprises an elongated cylindrical rod having one end portion connected to the door member, the medial portion of the connecting rod passing through the cylindrical bore of the supporting bracket, and the opposite end of the connecting rod being in the form of a bell-crank adapted to trip the actuating member of the toggle switch when the door is moved in a pivoted outward direction relative to the insulating block, the bell-crank being inoperative if the door member is swung in a direction toward the insulating block so as to have no effect on the actuating member and the associated switch means.

5. An electrical executing device for moles, gophers and like animals comprising:

a grid structure including a pair of spaced apart parallelly disposed bare electrically conductive grids, an insulating block member having one end of each grid attached thereto with the block member retaining the grids in horizontally extending vertically aligned spaced apart positions, an opening defining a doorway extending through the block intermediate the grids with the opening being of a size and configuration to permit a portion of the animal's body to project therethrough, suitably insulated electrical wires each having one end connected to an associated grid member with the opposite ends projecting outwardly of the insulating block;

a door suspended adjacent the doorway of the insulating block opposite of the grid members and disposed in a manner to block the doorway, the door being movable from a closed position covering the doorway in the insulating block to an outward open position uncovering the doorway, the door being moved in response to an outward pressure of an animal against the surface of the door when the animal is intermediate the grids and projecting through the doorway to engage the door member;

an electrical input means;

an electrical switch means adapted to electrically connect and disconnect the grid members from the electrical input means;

connecting means having one end connected and suspending the door member with the opposite end disposed adjacent the switch means such that outward movement of the door in response to the pressure of an animal will effect the activation of the switch means to electrically energize the grid members to electrocute the animal in contact therewith; and an electrically operated timer interposed in electrical series relationship intermediate the switch means and grid members to maintain the circuit electrically energized for a preset period of time after which the circuit is automatically de-energized until after the switch means has been manually reset.

6. The executing device as set forth in claim 5 further comprising an electrical warning lamp connected in electrical series relationship with the switch means, grid members and timer to provide a visual warning when the grid members are electrically energized.

7. The executing device as set forth in claim 6 wherein the door member is of a rectangular configuration of a size to substantially block the doorway of the insulating block, the connecting means being an elongated rod having one end connected to the door member with the opposite end disposed adjacent the switch means, the switch means comprising an electrical toggle switch having an actuating member adapted to be actuated by the adjacent end of the connecting rod, and guide means associated with the connecting rod for guiding the sliding movement thereof.

8. The executing device as set forth in claim 7 further comprising a substantially flat base member, an electrical box mounted on the base member, the electrical switch being mounted in the electrical box with the actuating switch member projecting outwardly of the box, the electrical warning lamp being mounted on the electrical box, and the guide means comprising a pair of axially aligned inverted winged U-shaped members secured to the base member in a manner defining axially aligned bores therethrough adapted to slidingly receive the connecting rod therethrough.

* * * * *